United States Patent
Zitlau et al.

(10) Patent No.: US 10,668,611 B1
(45) Date of Patent: Jun. 2, 2020

(54) MULTI-PURPOSE HAND TOOL

(71) Applicants: Lincoln Zitlau, Rigby, ID (US); Carl Zitlau, Rigby, ID (US)

(72) Inventors: Lincoln Zitlau, Rigby, ID (US); Carl Zitlau, Rigby, ID (US)

(*) Notice: Subject to any disclaimer, the term of this patent is extended or adjusted under 35 U.S.C. 154(b) by 0 days.

(21) Appl. No.: 16/040,583

(22) Filed: Jul. 20, 2018

Related U.S. Application Data

(60) Provisional application No. 62/539,730, filed on Aug. 1, 2017.

(51) Int. Cl.
| | | |
|---|---|---|
| *B25F 1/00* | (2006.01) | |
| *B23D 29/02* | (2006.01) | |
| *B25C 3/00* | (2006.01) | |
| *B25D 1/06* | (2006.01) | |
| *B25F 5/02* | (2006.01) | |
| *B25D 1/00* | (2006.01) | |

(52) U.S. Cl.
CPC ............ *B25F 1/006* (2013.01); *B23D 29/023* (2013.01); *B25F 1/003* (2013.01); *B25C 3/006* (2013.01); *B25C 3/008* (2013.01); *B25D 1/005* (2013.01); *B25D 1/06* (2013.01); *B25F 5/027* (2013.01)

(58) Field of Classification Search
CPC ......... B25C 3/006; B25C 3/008; B25F 1/006; B25F 5/027; B25D 1/005; B25D 1/06
USPC ............................................ 7/117; 81/23, 44
See application file for complete search history.

(56) References Cited

U.S. PATENT DOCUMENTS

| | | | |
|---|---|---|---|
| 1,344,114 A | 6/1920 | Carlson | |
| 1,879,402 A | 9/1932 | Monahan | |
| 2,482,909 A | 9/1949 | Hertz | |
| 3,238,983 A * | 3/1966 | Abrahamsen | B25D 1/005 227/120 |
| 4,953,248 A | 9/1990 | Trombetta | |
| 5,636,398 A | 6/1997 | Fike | |
| 5,934,342 A | 8/1999 | Danielson | |
| 6,301,996 B1 * | 10/2001 | Crawford | B25D 1/06 81/23 |
| 6,314,599 B1 | 11/2001 | Hay | |
| 7,249,541 B1 | 7/2007 | Osborne | |
| 8,973,467 B2 | 3/2015 | Bronee | |

FOREIGN PATENT DOCUMENTS

| | | |
|---|---|---|
| AU | 7327591 B | 6/1993 |
| CN | 1105922 A | 8/1995 |
| CN | 200984731 Y | 12/2007 |

(Continued)

OTHER PUBLICATIONS

Baum Professional Tools, "Fencing Pliers with Hammer Head", 1 page, printed on May 3, 2018.

(Continued)

*Primary Examiner* — Monica S Carter
*Assistant Examiner* — Katina N. Henson
(74) *Attorney, Agent, or Firm* — Cahn & Samuels, LLP

(57) ABSTRACT

A multi-purpose hand tool includes a first side and a second side that are pivotally connected. The first side includes a lower end having a first handgrip and an upper end including a shaft having a hammer head at one end; a first recess extending at least partially along a bottom of the shaft for holding one or more straight fasteners; and a second recess located substantially in a bottom part of the hammer head for holding one or more rounded fasteners.

10 Claims, 7 Drawing Sheets

(56) References Cited

FOREIGN PATENT DOCUMENTS

| | | |
|---|---|---|
| CN | 201931449 U | 8/2011 |
| CN | 204868592 U | 12/2015 |
| CN | 206296862 U | 7/2017 |
| FR | 574894 | 7/1924 |
| FR | 2834923 A1 | 7/2003 |
| GB | 458926 | 12/1936 |

OTHER PUBLICATIONS

Pillowbread, "Universal Multi-functional Hammer", 7 pages, printed on May 3, 2018.
English Abstract of CN 200984731, Dec. 5, 2007.
English Abstract of CN 1105922, Aug. 2, 1995.
English Abstract of CN 201931449, Aug. 17, 2011.
English Abstract of CN 206296862, Jul. 4, 2017.
English Abstract of FR 2834923, Jul. 25, 2003.
English Abstract of CN 204868592, Dec. 16, 2015.
U.S. Pat. No. 372,560 to Overstreet, dated Nov. 1, 1887.
English translation of FR 574894, Jul. 21, 1924.

\* cited by examiner

MULTI-PURPOSE HAND TOOL

This patent application claims priority to U.S. Ser. No. 62/539,730 filed in the U.S. Patent and Trademark Office on 1 Aug. 2017, the entirety of which is incorporated herein by reference.

FIELD OF INVENTION

The present invention relates to a hand tool used for performing construction and maintenance activities. More specifically, the present invention is directed to a multi-purpose hand tool for installing, repairing, and/or removing materials related to barriers, such as wire fence structures.

BACKGROUND OF THE INVENTION

Hand tools serve an important function in the construction and maintenance of buildings and other structures. Such construction and maintenance activities often require various tools.

There are situations in which a worksite is located at a considerable distance from the required tools. Thus, the location of a worksite and limitations on transportation may reduce accessibility to a diverse range of tools. In particular, access to a selection of tools may be limited in the building, repair, and/or replacement of barriers defining the perimeter of a property.

Perimeters of property are frequently defined by barriers, such as wire fences, which are used to isolate the property, for example, to contain livestock or to exclude wildlife or unwelcome individuals. If the integrity of a barrier is compromised (e.g., by acts of nature, livestock, wild animals, human intervention, or the like) a portion of the barrier may need to be repaired or replaced. The timely repair of a compromised barrier, like a wire fence, may minimize damage that could result from escaped livestock, which could cause harm to the livestock, to people, and to property.

Accordingly, there is a need for a single hand tool that can perform multiple tasks in the building, repair, and/or replacement of barriers. Specifically, it is desirable to have an easily-transportable, multi-purpose hand tool that facilitates repair and replacement of wire fencing, thereby reducing the need to transport multiple tools to a worksite.

SUMMARY OF THE INVENTION

According to an embodiment of the present invention, a multi-purpose hand tool includes a first side and a second side that are pivotally connected. The first side comprises a lower end having a first handgrip and an upper end comprising a shaft having a hammer head at one end; a first recess extending at least partially along a bottom of the shaft for holding one or more straight fasteners; and a second recess located substantially in a bottom part of the hammer head for holding one or more rounded fasteners.

According to another embodiment, the second side of the multi-purpose hand tool may comprise a lower end having a second handgrip; and an upper end having a claw comprising two or more tines and extending outwardly in a direction opposite from the shaft.

According to yet another embodiment, the second side of the multi-purpose hand tool may comprise a pivot point on a top positioned at a point where the top slopes towards the claw.

According to another embodiment, the second recess may comprise grooves capable of holding a U-shaped fastener or staple.

According to yet another embodiment, the multi-purpose hand tool may comprise a magnet at a point where a bent portion of the U-shaped fastener or staple is held within the second recess.

According to a further embodiment, the multi-purpose hand tool may have a first recess that widens towards the hammer head and comprises shoulders or grooves forming the second recess.

An advantage of the hand tool of the present invention is that it allows an operator to use only one hand to operate the tool and start a hammering or fastening process without having to hold fasteners with the other hand at the same time.

Another advantage of the hand tool of the present invention is that it can hold two different kinds of fasteners simultaneously.

Yet another advantage of the hand tool of the present invention is that an operator may have the use of a free hand to align parts of the barrier or wire fence that is being worked on. Safety is greatly enhanced by reducing the likelihood of operators inadvertently impacting their hands or fingers while using the tool.

In the detailed description, references to "one embodiment", "an embodiment", or "in embodiments" mean that the feature being referred to is included in at least one embodiment of the invention. Moreover, separate references to "one embodiment", "an embodiment", or "embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

As used herein "substantially", "generally", and other words of degree are relative modifiers intended to indicate permissible variation from the characteristic so modified (e.g., ±0.1%, ±0.5%, ±1.0%, ±2%, ±5%, ±10%, ±20%). It is not intended to be limited to the absolute value or characteristic which it modifies but rather possessing more of the physical or functional characteristic than its opposite, and preferably, approaching or approximating such a physical or functional characteristic.

DETAILED DESCRIPTION OF THE INVENTION

The present invention relates to a multi-purpose hand tool suitable for at least one of installing, repairing, or removing materials related to wire fences. Although the description is directed to a hand tool that is manually operated, it is understood that, in other embodiments, the hand tool could be powered by another source (e.g., electricity, gas). In addition, although the description is directed to using the hand tool with wire, it is understood that the hand tool could also be used with cable, twine, rope, electrical wire, and the like.

The hand tool may be made by any customary method of making hand tools. In a specific embodiment, the hand tool is made by investment casting followed by heat treatment in order to obtain a desired hardness.

Figure 1:
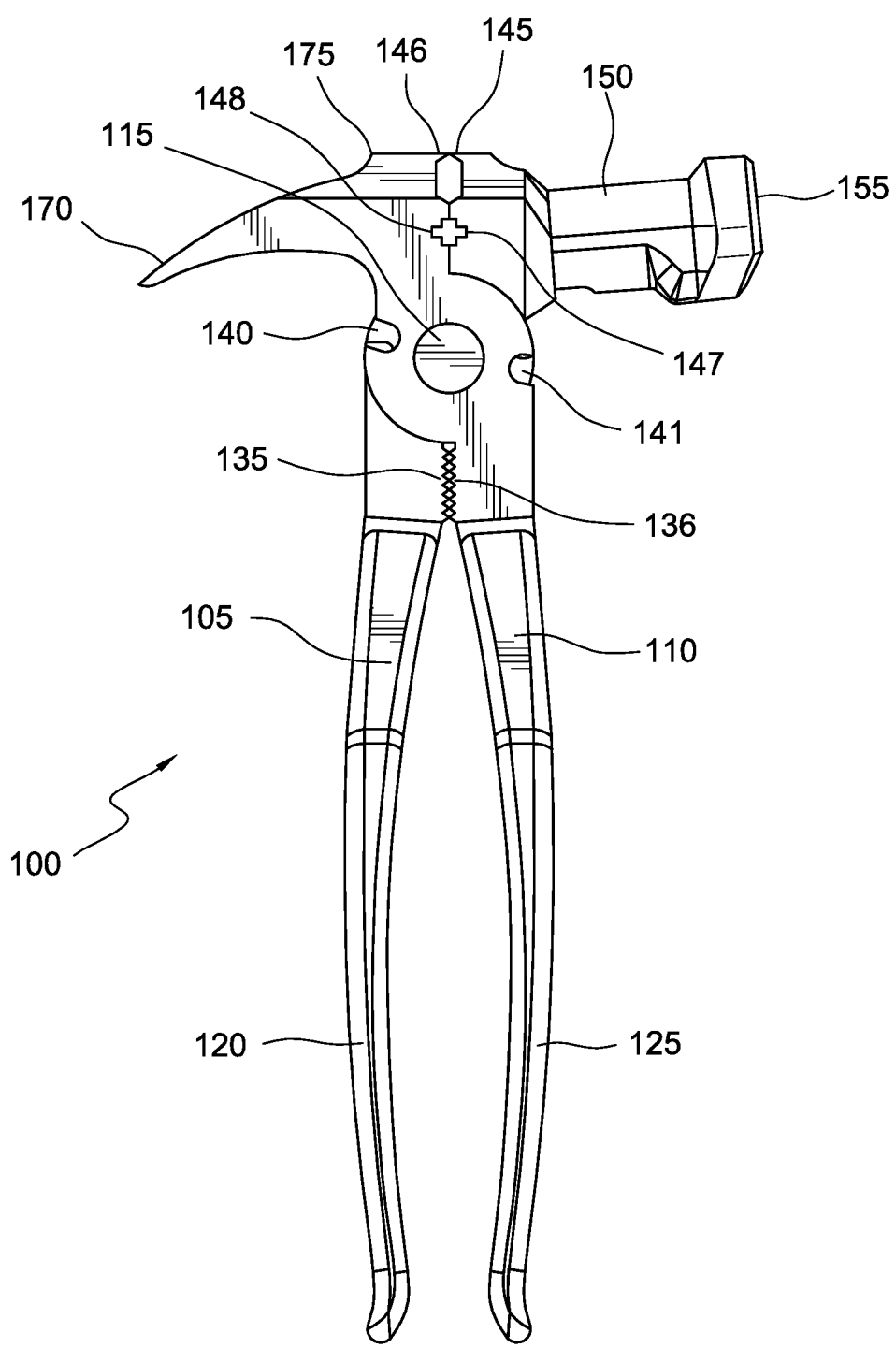
FIG. 1 illustrates a side view of a multi-purpose hand tool according to an embodiment of the present invention in which handgrips are in a closed position.

FIG. 1 illustrates an embodiment of the multi-purpose hand tool 100 comprising a first body or side 105 and a second body or side 110. Sides 105, 110 are interconnected at and pivot or rotate about a centrally located axis 115 in a plier-like or scissor-like manner. In embodiments, the axis 115 may comprise a rivet, pin, bolt, or hinge. FIG. 1 shows the hand tool in which handgrips 120, 125 in a closed position and FIG. 2 shows the hand tool in which handgrips 120, 125 are in a partially open position.

Figure 2:
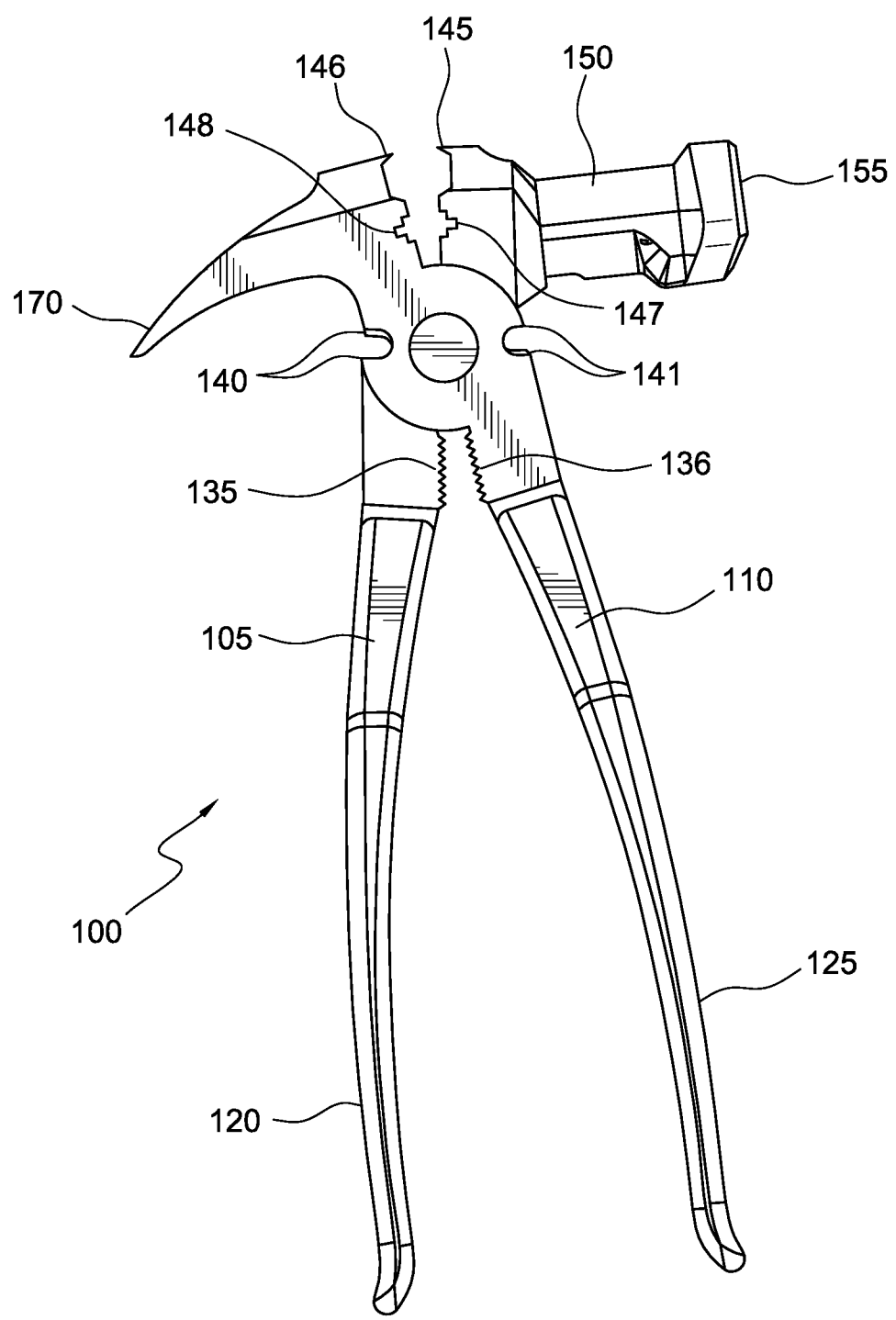
FIG. 2 illustrates a side view of a multi-purpose hand tool of FIG. 1 with the handgrips partially open.
Figure 3:
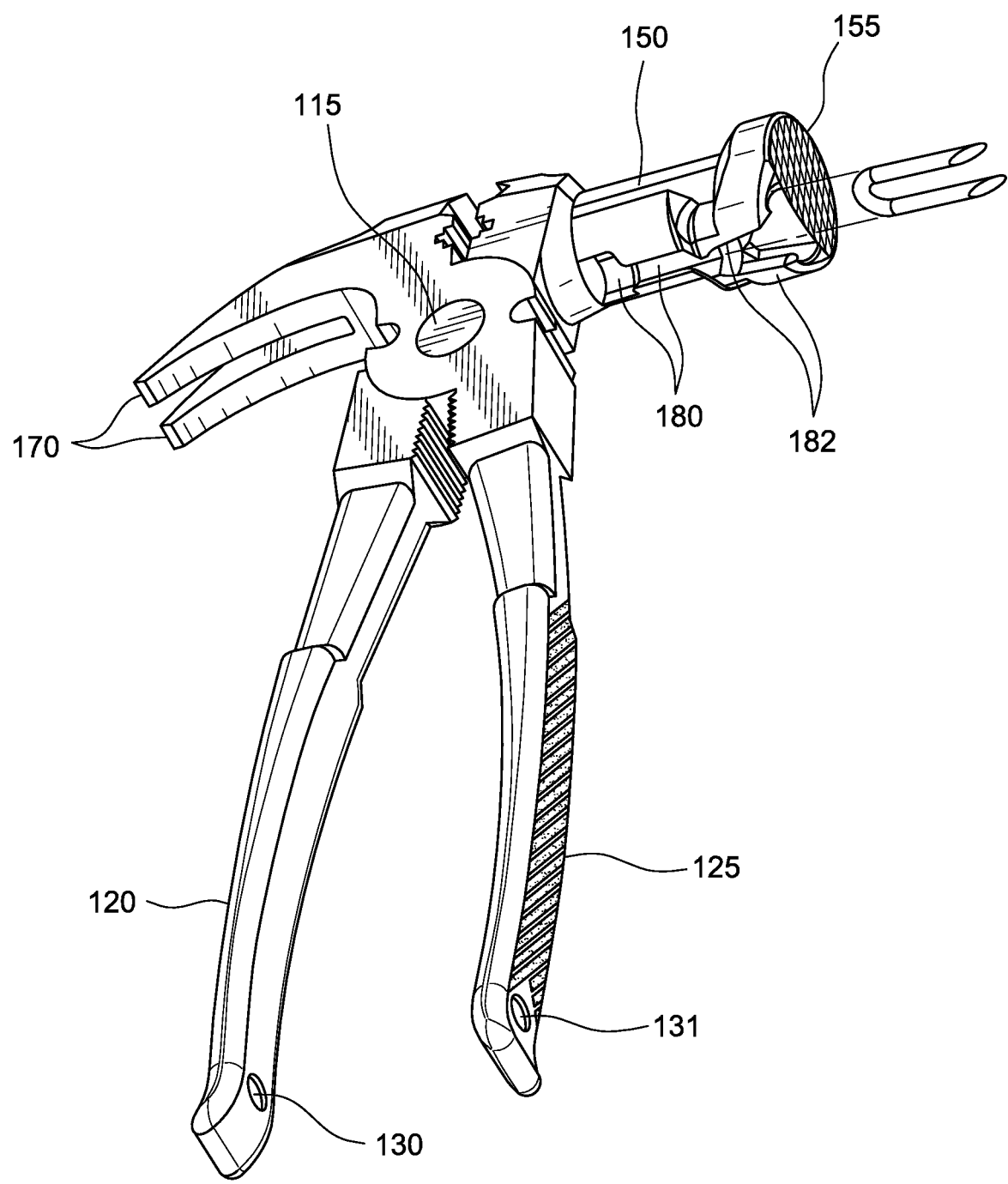
FIG. 3 illustrates a perspective view of a multi-purpose hand tool according to an embodiment of the invention with a U-shaped fastener exiting a fastener holder.

As shown in FIGS. 1-3, first side 105 comprises an elongated handgrip 120; clip bender 130 near the bottom of the handgrip; gripping teeth 135; cutting surface 140; pincer 145; blunt pincer 147; an elongated shaft 150 extending outwardly; and a hammer head 155 located at an end of elongated shaft 150. The elongated shaft enables the tensioning of wire by winding the wire around the shaft, taking up the slack in the wire, and applying desired tension to achieve optimal barrier or fence construction.

As further shown in FIGS. 1-3, second side 110 comprises an elongated handgrip 125, clip bender 131 near the bottom of the handgrip; gripping teeth 136, cutting surface 141; claw 170 extending outwardly in a direction opposite from the elongated shaft 150; pincer 146; and blunt pincer 148. The second side 110 has a pivot point 175 positioned on the top, where the flat top begins to slope towards claw 170.

The elongated handgrips 120, 125 are located at a lower end of the sides 105, 110 beneath axis 115, respectively. The hammer head 155 and a claw 170 are located at an upper end of the sides 105, 110 above axis 115, respectively. In specific embodiments, claw 170 may have two or more tines. The tines may narrow towards each other nearing a center of the hand tool, such that part of a fastener (e.g., a nail) may be trapped and gripped between the tines, thereby allowing for a user to manipulate the fastener. In specific embodiments, the pivot point 175, in combination with claw 170, helps a user pull fasteners from a barrier. The upper ends of sides 105, 110 form a substantially unitary part including elongated shaft, hammer head, pincers, pivot point, and claw when the handgrips are in a closed position (FIG. 1).

Below the axis 115, the handgrips 120, 125 have opposing gripping teeth 135, 136, respectively, thereby providing the ability to clamp or grip objects that are placed between the gripping teeth. In specific embodiments, the gripping teeth have a sawtooth configuration that provides an ability to clench an object without shearing it.

Near the bottom of elongated handgrips 120, 125 are clip benders 130, 131, respectively. The clip benders 130, 131 may comprise orifices or holes of any desired configuration. In specific embodiments, the ends of wire retainers may be inserted into the clips to secure wire to fence posts and to leverage the clips into place. The clip benders may serve as a way to secure the hand tool for transportation or storage.

Side 105 has cutting surface 140 located on an outer edge thereof near the axis 115. Side 110 has cutting surface 141 located on an outer edge thereof near the axis 115. In specific embodiments, one or both cutting surfaces may comprise a notch or recess in a side of the hand tool. The notches or recesses may be sized to receive different sizes or gauges of wire.

When the hand tool is open (e.g., by extending handgrips 120, 125 apart from each other and pivoting about axis 115 as shown in FIG. 2), the cutting surfaces 140, 141 may line up with each other, so that a wire or wires can fit into the notches or recesses. When the hand tool is moved into a closed position (e.g., by moving handgrips 120, 125 toward each other and pivoting about axis 115 as shown in FIG. 1), the cutting surfaces 140, 141 provide a shearing force for cutting the wire or wires. In specific embodiments, a first cutting surface may be configured to have a greater depth than that of a second cutting surface. Thus, the first cutting surface may shear a larger wire or multiple wires; whereas, the second cutting surface may have a depth for shearing a smaller wire or a single wire.

At an upper end of side 105 above the axis 115, there are blunt pincer 147 and pincer 145. At an upper end of side 110 above the axis 115, there are corresponding blunt pincer 148 and pincer 146. When the sides 105, 110 are in the closed position, as in FIG. 1, both the blunt pincers 147, 148 and the pincers 145, 146 form respective cavities for seizing and clamping wire. By applying sufficient force, pincers 145, 146 may be useful for cutting, gripping, or manipulating wires and fasteners. In a specific embodiment, the pincers 145, 146 may each have an inwardly angled or sloped side at a top portion, thereby enabling grasping, stretching, and pulling of one or more wires.

Figure 4:
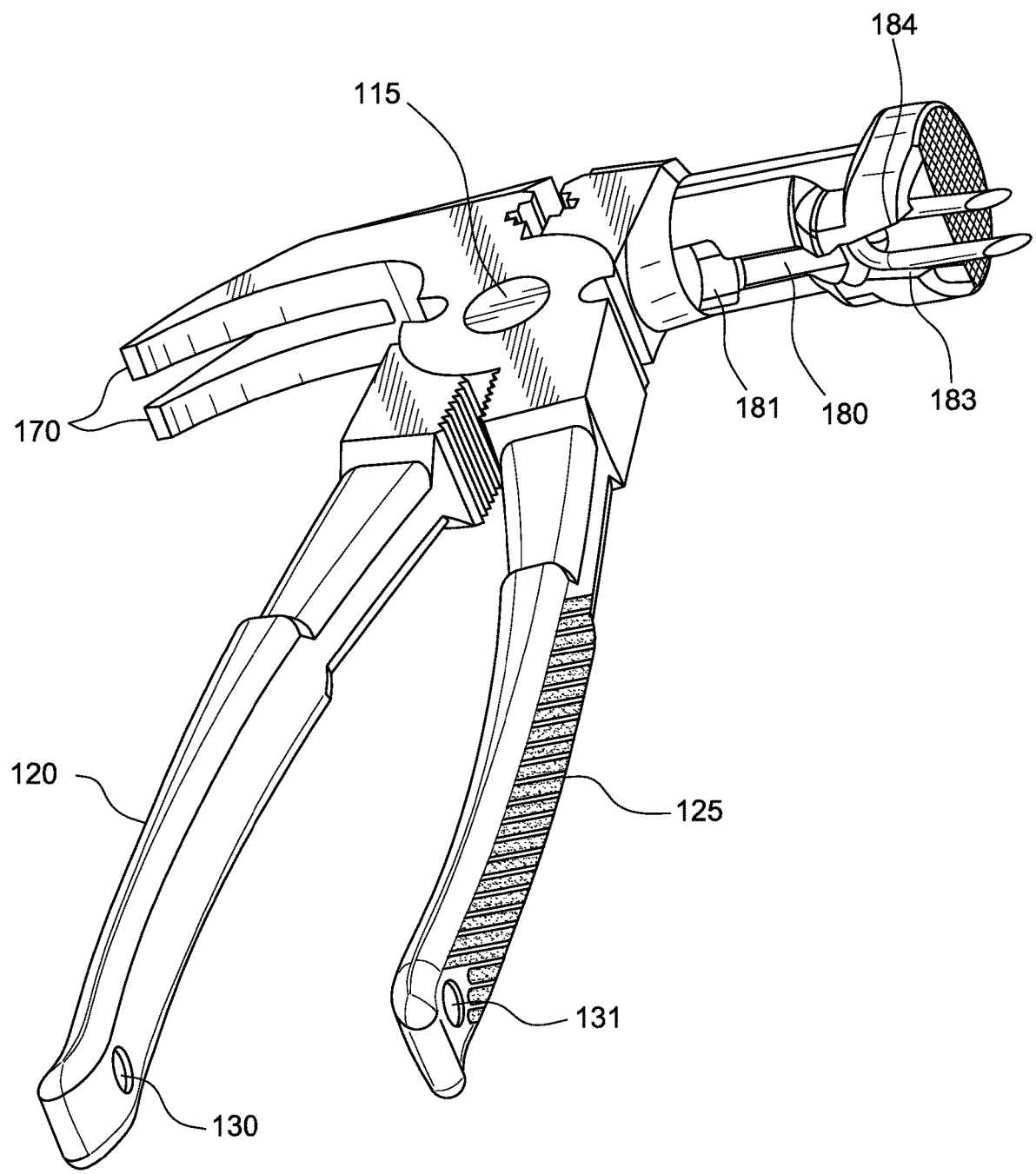
FIG. 4 illustrates another perspective view of the multi-purpose hand tool of FIG. 3 showing the U-shaped fastener in the fastener holder.
Figure 5:
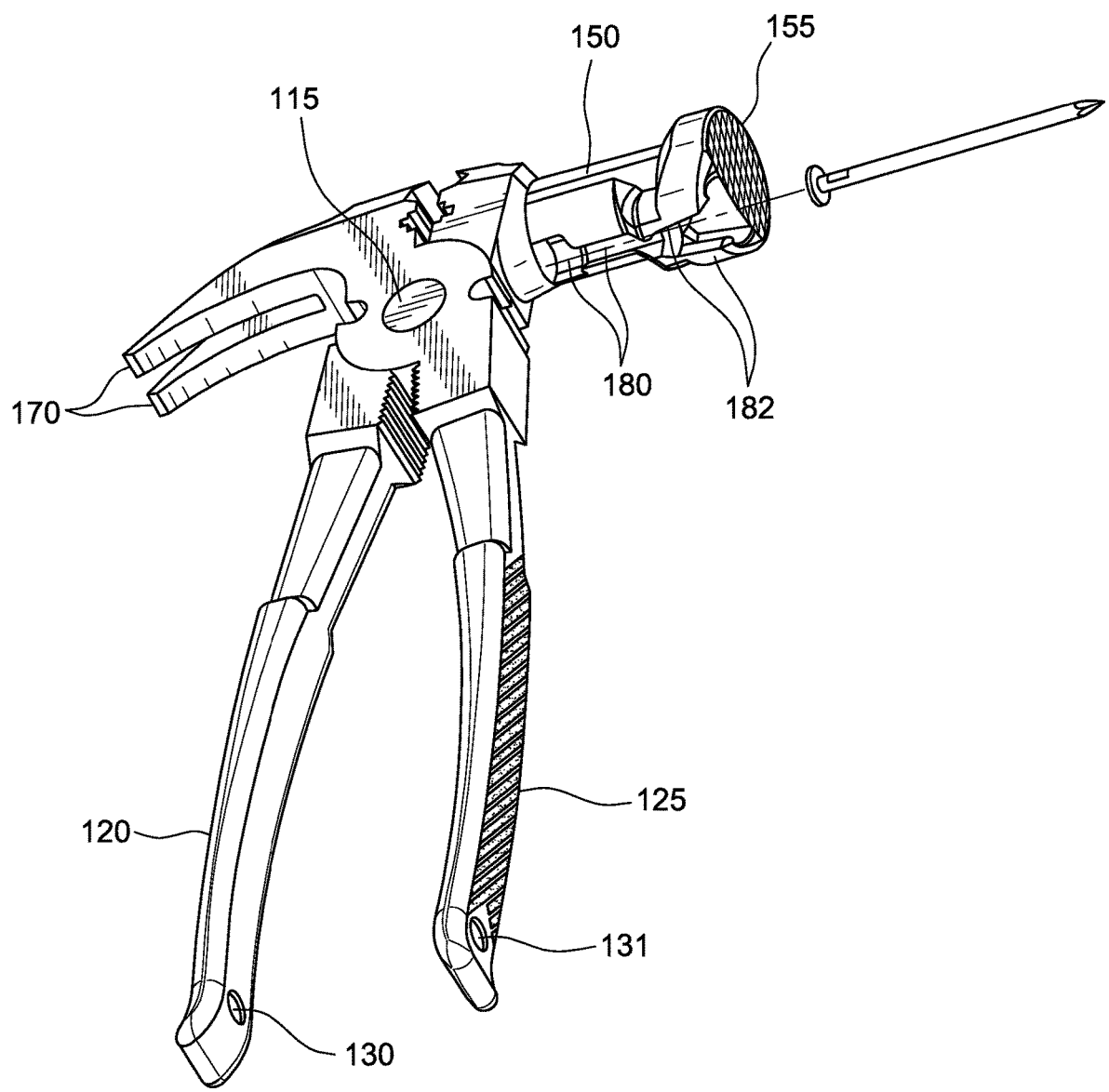
FIG. 5 illustrates a perspective view of a multi-purpose hand tool showing a nail exiting from a nail holder according to an embodiment of the present invention.
Figure 6:
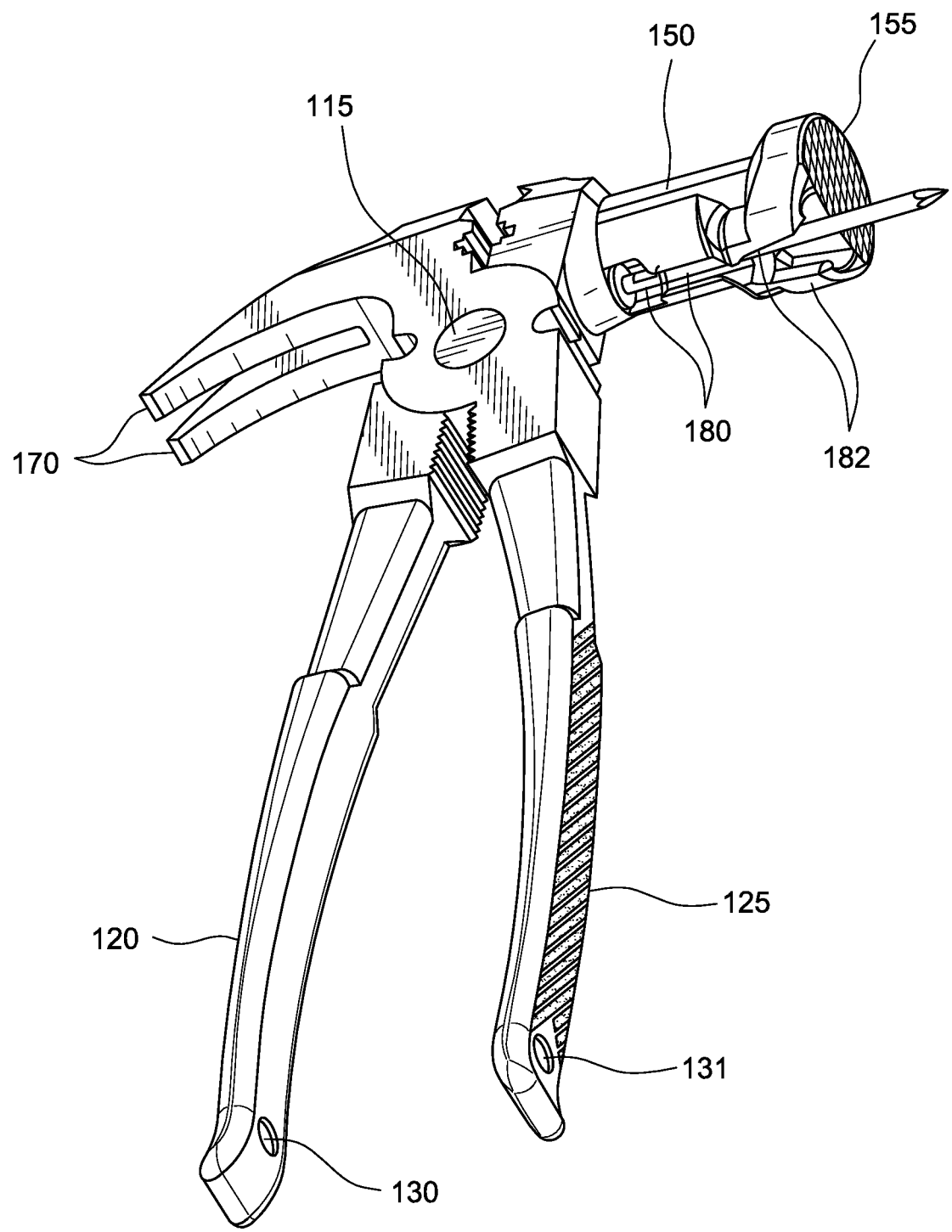
FIG. 6 illustrates a perspective view of the multi-purpose hand tool of FIG. 5 with a nail located in the nail holder.

According to the present invention, as shown in FIGS. 3-6, elongated shaft 150 comprises a first recess 180 extending at least partially along a bottom section or portion of the shaft and including the hammer head 155. The first recess 180 is configured to receive one or more straight fasteners, such as nails or screws (FIGS. 5-6). In embodiments, the first recess 180 may have a greater depth at one end 181 (FIG. 4) configured to accommodate fasteners whose heads are of a greater circumference in relation to the length of the fastener body. The first recess 180 allows a user to insert one or more straight fasteners into the recess prior to starting any hammering action. In one embodiment, the one or more straight fasteners may be spring-loaded in the first recess.

According to an embodiment of the present invention, a second recess 182 may be located substantially in a bottom part or section of the hammer head 155. Second recess 182 may comprise opposing grooves 183, 184 capable of holding one or more rounded fasteners (FIG. 4). In embodiments, each opposing groove 183, 184 is configured to hold at least part of a parallel side of a rounded or U-shaped fastener. The opposing grooves 183, 184 may be configured to hold any size of rounded fastener, for example, fasteners for chicken wire or for standard wire fencing on ranches and farms. Rounded or U-shaped staples are particularly suited for attaching wire to a fence post or barrier. In a specific embodiment, second recess 182 holds a portion of rounded or U-shaped fastener, such that a substantial part of the parallel sides or prongs of the fastener extend outside the hammer head 155 (FIG. 4).

Second recess 182 may be separate from or integral with first recess 180. In specific embodiments, first recess 180 may widen towards the hammer head and include opposing shoulders, ledges, or grooves 183, 184 forming recess 182. Thus, the hand tool can hold one or more fasteners, so that an operator can begin a hammering or driving action in order to drive the one or more fasteners into a barrier with the hammer head.

Figure 7:
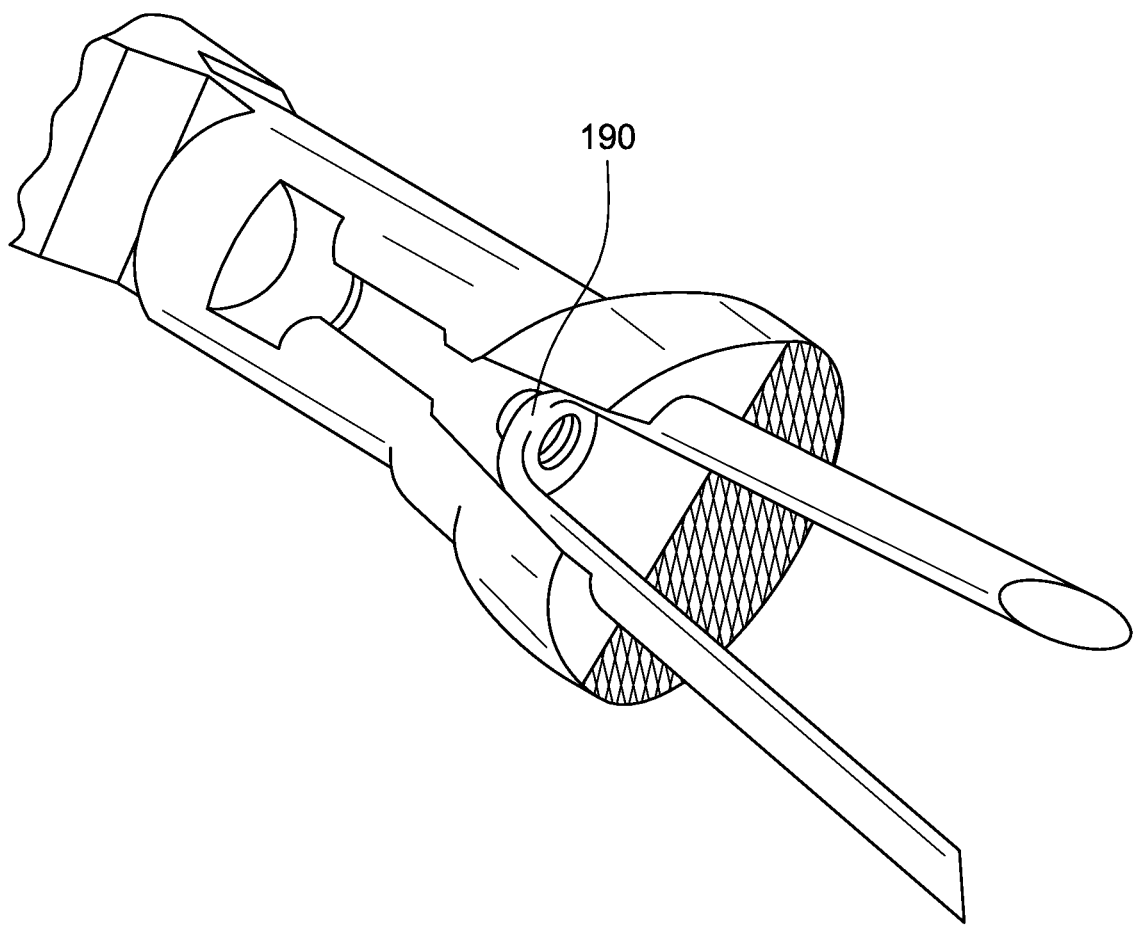
FIG. 7 illustrates a bottom perspective view of a shaft and hammer head with a U-shaped fastener and magnet according to an embodiment of the present invention.

According to an embodiment of the present invention, at least a portion of first recess 180 and/or second recess 182 may be magnetic to assist in holding a fastener in place. In a specific embodiment, a magnet 190 may be attached within second recess 182 or within shaft 150 at a point where a U-shaped staple is held, particularly the bent portion of a U-shaped staple within recess 182, as shown in in FIG. 7.

In a specific embodiment, the one or more straight fasteners and/or the one or more rounded fasteners are held in a horizontal orientation relative to a longitudinal axis of the shaft. Although the second recess is discussed above as being positioned or located beneath the first recess, it is possible to configure the hand tool such that the second recess would be positioned above the first recess.

Although only certain embodiments of the invention have been illustrated in the foregoing specification, it is understood by those skilled in the art that many modifications and embodiments of the invention will come to mind to which the invention pertains, having benefit of the teaching presented in the foregoing description and associated drawings.

It is therefore understood that the invention is not limited to the specific embodiments disclosed herein, and that many modifications and other embodiments of the invention are intended to be included within the scope of the invention. Moreover, although specific terms are employed herein, they are used only in a generic and descriptive sense, and not for the purposes of limiting the description of the invention.

What is claimed is:

1. A multi-purpose hand tool, comprising a first side and a second side that are pivotally connected, said first side comprising a lower end and an upper end, said upper end comprising:
   1) a shaft having a hammer head at one end;
   2) a first recess extending at least partially along a bottom of the shaft, said first recess comprising:
      a) an end located in the shaft opposite the hammer head and having a depth configured to hold a head of a straight fastener, said depth being greater than the depth of a remaining part of the first recess, and
      b) opposing ledges on the bottom of the shaft that hold a body of the straight fastener in a horizontal orientation relative to a longitudinal axis of the shaft so that an end of the straight fastener extends from a lower part of the striking surface of the hammer head;
   3) a second recess located substantially in a bottom part of the hammer head, said second recess comprising:
      a) a flat part formed by the body of the hammer head; and
      b) opposing sides of the hammer head extending downwardly from the flat part and forming opposing grooves that hold parallel sides of a U-shaped fastener in a perpendicular orientation relative to a longitudinal axis of the first side, so that both ends of the U-shaped fastener extend from a lower part of the striking surface of the hammer head; and
   4) a magnet at a point where a bent portion of the U-shaped fastener is held within said second recess, wherein said first recess widens towards the hammer head and is integral with said second recess.

2. The multi-purpose hand tool according to claim 1, wherein the second side comprises:
   a lower end having a second handgrip; and
   an upper end comprising a claw comprising two or more tines and extending outwardly in a direction opposite from the shaft.

3. The multi-purpose hand tool according to claim 2, wherein the second side further comprises a pivot point on a top, positioned at a point where the top slopes towards the claw.

4. The multi-purpose hand tool according to claim 1, wherein:
   the first side further comprises a first cutting surface in the form of a notch or recess in an outer edge;
   the second side further comprises a second cutting surface in the form of a notch or recess in an outer edge; and
   the first cutting surface is configured to cut one or more wires having a greater diameter than a wire cut by the second cutting surface.

5. The multi-purpose hand tool according to claim 2, wherein the first and second sides each further comprise an orifice near a bottom of their respective handgrips.

6. The multi-purpose hand tool according to claim 1, wherein the first and second sides are pivotally connected about a rivet, pin, bolt, or hinge.

7. The multi-purpose hand tool according to claim 1, wherein the U-shaped fastener is a U-shaped staple.

8. The multi-purpose hand tool according to claim 1, wherein the straight fastener is a nail or screw.

9. The multi-purpose hand tool according to claim 1, wherein the opposing grooves hold parallel sides of a U-shaped fastener in a horizontal orientation relative to a longitudinal axis of the shaft.

10. The multi-purpose hand tool according to claim 1, wherein the first recess comprises an opening extending at least partially along the bottom of the shaft.

* * * * *